US 8,606,099 B2

(12) United States Patent
Duan et al.

(10) Patent No.: US 8,606,099 B2
(45) Date of Patent: *Dec. 10, 2013

(54) METHOD AND SYSTEM FOR PROTECTING INTEGRATED OPTOELECTRONIC DEVICES

(75) Inventors: Yong Duan, Shenzhen (CN); Zhihui Tao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 780 days.

This patent is subject to a terminal disclaimer.

(21) Appl. No.: 12/398,684

(22) Filed: Mar. 5, 2009

(65) Prior Publication Data

US 2009/0226161 A1 Sep. 10, 2009

Related U.S. Application Data

(63) Continuation of application No. PCT/CN2007/070095, filed on Jun. 11, 2007.

(30) Foreign Application Priority Data

Oct. 27, 2006 (CN) .......................... 2006 1 0142657

(51) Int. Cl.
H04B 10/00 (2013.01)
H04B 10/08 (2011.01)

(52) U.S. Cl.
USPC .............. 398/2; 398/1; 398/5; 398/7; 398/17; 398/23; 398/34

(58) Field of Classification Search
USPC ......................................... 398/1–8
See application file for complete search history.

(56) References Cited

U.S. PATENT DOCUMENTS

| 5,612,968 | A | 3/1997 | Zah |
| 6,172,782 | B1 | 1/2001 | Kobayashi |
| 2001/0046074 | A1 | 11/2001 | Kakizaki et al. |
| 2001/0050928 | A1 | 12/2001 | Cayrefourcq et al. |
| 2004/0161232 | A1 | 8/2004 | Kerfoot, III |

(Continued)

FOREIGN PATENT DOCUMENTS

| CN | 1416234 A | 5/2003 |
| CN | 1431794 A | 7/2003 |

(Continued)

OTHER PUBLICATIONS

2nd Office Action in corresponding Japanese Application No. 2009-533645 (May 31, 2011).

(Continued)

Primary Examiner — Li Liu
(74) Attorney, Agent, or Firm — Leydig, Voit & Mayer, Ltd.

(57) ABSTRACT

A method and system for protecting integrated optoelectronic devices are disclosed. The method includes (1) providing standby light source links of fixed wavelength and their corresponding standby data channel in a transmitting-end integrated optoelectronic device; (2) detecting whether there is failure in each active light source link in the transmitting-end integrated optoelectronic device; and (3) selecting a standby light source link having a fixed wavelength and its corresponding standby data channel for accomplishing service transmission of failed active light source link and its corresponding active data channel when detecting failure of an active light source link. The system includes a transmitting-end integrated optoelectronic device and a receiving-end integrated optoelectronic device.

17 Claims, 8 Drawing Sheets

(56) References Cited

U.S. PATENT DOCUMENTS

| | | | |
|---|---|---|---|
| 2005/0078957 A1* | 4/2005 | Hendow | 398/33 |
| 2005/0100345 A1* | 5/2005 | Welch et al. | 398/183 |
| 2006/0024058 A1* | 2/2006 | Nabeyama et al. | 398/79 |
| 2006/0045520 A1* | 3/2006 | Nakano et al. | 398/33 |
| 2006/0133804 A1* | 6/2006 | Boduch et al. | 398/5 |
| 2007/0092177 A1* | 4/2007 | Nilsson et al. | 385/14 |

FOREIGN PATENT DOCUMENTS

| | | |
|---|---|---|
| CN | 1505283 A | 6/2004 |
| CN | 2641926 Y | 9/2004 |
| CN | 1642060 A | 7/2005 |
| CN | 1936630 A | 3/2007 |
| EP | 0636908 A1 | 2/1995 |
| EP | 1 450 509 A2 | 8/2004 |
| JP | 7154371 A | 6/1995 |
| JP | 10322287 A | 12/1998 |
| JP | 2000151514 A | 5/2000 |
| JP | 2001085798 A | 3/2001 |
| JP | 2001274751 A | 10/2001 |
| JP | 2004254317 A | 9/2004 |
| JP | 2009-524954 T | 7/2009 |
| WO | WO 03/003424 A1 | 1/2003 |
| WO | WO 03/032021 A2 | 4/2003 |

OTHER PUBLICATIONS

Written Opinion from the International Searching Authority in corresponding PCT Application No. PCT/CN2007/070095 (Aug. 2, 2007).

1st Chinese Office Action in corresponding Chinese Patent Application No. 200610142657.7 (Nov. 30, 2007).

Japanese Patent Office, Examination Report in Japanese Patent Application No. 2009-533645.

* cited by examiner

METHOD AND SYSTEM FOR PROTECTING INTEGRATED OPTOELECTRONIC DEVICES

CROSS-REFERENCE TO RELATED APPLICATIONS

This application is a continuation of International Patent Application No. PCT/CN2007/070095, filed Jun. 11, 2007, which claims priority to Chinese Patent Application No. 200610142657.7, filed Oct. 27, 2006, both of which are hereby incorporated by reference in their entirety.

FIELD OF THE INVENTION

The present invention relates to optical communication technology and in particular to a method and a system for protecting integrated optoelectronic devices.

BACKGROUND

Dense wavelength division multiplexing (DWDM) technology is a dominant technology in long-distance and area trunk transmission networks and gradually comes into metropolitan area networks. Traditional DWDM systems use independent device packages in which cards are made surrounding one or more optical devices and connected through optical fibers.

Prices of optical devices fall constantly as technology advances. Up to now, only costs of encapsulating optical devices are still high and become a bottle neck constraining optical device costs. As a typical example, a core of laser only costs several dollars while its package will cost hundreds of dollars.

In recent years, efforts have been made to integrate multiple optical devices such as lasers and modulators into a single semiconductor substrate so as to reduce cost of packaging an optical device separately. Meanwhile, a smaller package also enables the volumes of submodules in a DWDM system such as transmitting, receiving and monitoring submodules to substantially decrease.

An optoelectronic integrated circuit is a circuit that integrates multiple optical devices in a common semiconductor substrate with corresponding peripheral control circuits. FIG. 1 is a diagram showing internal structure of an integrated optoelectronic device at a transmitting end in the prior art. Referring to FIG. 1, for achieving information transmission by optoelectronic integrated circuit, in the conventional art, the transmitting-end integrated optoelectronic device includes therein a high-level control unit, a data exchange unit, a light source link control unit, n light source links and their corresponding n data channels as well as a wavelength multiplexed unit. FIG. 2 is a diagram showing a transmitting end in the prior art, in which data transmission is performed by data channels and light source links. Referring to FIGS. 1 and 2, in practical service implementations, each light source link mainly includes a light source and a modulator and may further include a light path tap module. The link detecting circuit in light source link control unit detects performance of each light source link with the Tap module in each light source link, to enable the light source link control unit to properly adjust light source link according to detection results, such as adjusting optical power in the light source link. FIG. 3 is a diagram showing structure of an integrated optoelectronic device at a receiving end in prior art. Referring to FIG. 3, the receiving-end integrated optoelectronic device mainly includes therein a wavelength demultiplexed unit, n optical receiving units and an electronic data processing unit.

During information transmission, in the transmitting-end integrated optoelectronic device, the light source in the light source link generates optical signals and outputs the optical signals to the modulators. The corresponding data channels output electronic signals to the modulators that modulate the received optical signals and electronic signals to produce optical signals to be output to the wavelength multiplexed module. The wavelength multiplexed module multiplexes optical signals received from all light source links and outputs the multiplexed optical signals to the receiving-end integrated optoelectronic device. In the receiving-end integrated optoelectronic device, the wavelength demultiplexed unit demultiplexes the received optical signals and outputs the demultiplexed n paths of optical signals to corresponding optical receiving units. Each optical receiving unit converts the received optical signals into electronic signals and then outputs them to the electronic data processing unit for corresponding processing.

At present, optical signals have advantages such as strong anti-jamming performance and fast transmission speed over electronic signals in terms of information transmission. Therefore, the integrated optoelectronic devices are widely applied.

However, there is no effective protective measure for integrated optoelectronic devices at present and each light source link would be used as an active link for practical service transmission. Thus, when any one of the light source links in an integrated optoelectronic device fails, for example, when the light source does not generate light or the modulator fails, the entire integrated optoelectronic device will malfunction, and the reliability of the integrated optoelectronic device is thereby decreased. One approach for curing such a malfunction in existing systems is to replace, the light source links of the integrated optoelectronic device. However, since the components of each light source link in the integrated optoelectronic device are integrated onto a single substrate in a single package, it is impossible to replace the failed light source link independently. Therefore, in the existing systems it is necessary to replace the entire optoelectronic integrated circuit when only an individual component fails, thereby significantly increasing maintenance and repair costs.

SUMMARY

An embodiment of the present invention is directed to a method and a system for protecting integrated optoelectronic devices, so as to provide effective protective measures for integrated optoelectronic devices and increase the reliability of the integrated optoelectronic devices.

Specifically, a method is provided for protecting integrated optoelectronic devices including (1) detecting whether there is failure in each active light source link in a transmitting-end integrated optoelectronic device; and (2) selecting a standby light source link having a fixed wavelength and its corresponding standby data channel provided in advance for accomplishing service transmission of the failed active light source link and its corresponding active data channel, when detecting that an active light source link fails.

According to another embodiment, an integrated optoelectronic device includes active light source links and their corresponding active data channels as well as a wavelength multiplexed unit. The integrated optoelectronic device further includes a protection processing unit, standby light source links of fixed wavelength and standby data channels.

The protection processing unit is configured to detect whether there is failure in each active light source link, to select a standby light source link having a fixed wavelength and its corresponding standby data channel provided in advance, to transmit an enabling instruction to the selected standby light source link having a fixed wavelength, and to control a process of switching an electronic signal of an active data channel corresponding to a failed active light source link to the standby data channel corresponding to the selected standby light source link, when detecting that an active light source link fails.

The selected standby light source link having a fixed wavelength is configured to modulate optical signals generated by light sources of itself with electronic signals output from its corresponding standby data channel and to transmit the modulated optical signals to the wavelength multiplexed unit, after receiving the enabling instruction.

The standby data channel corresponding to the selected standby light source link is configured to transmit received electronic signals to the selected standby light source link.

A system for protecting integrated optoelectronic devices includes a transmitting-end integrated optoelectronic device and a receiving-end integrated optoelectronic device, and the receiving-end integrated optoelectronic device includes a wavelength demultiplexed unit, optical receiving units, and a switch processing unit.

The transmitting-end integrated optoelectronic device is configured to detect whether there is failure in each active light source link, and to select a standby light source link having a fixed wavelength and its corresponding standby data channel for accomplishing service transmission of the failed active light source link and its corresponding active data channel, and to transmit a wavelength-multiplexed optical signal to a wavelength demultiplexed unit in the receiving-end integrated optoelectronic device, when detecting an active light source link is failed.

The wavelength demultiplexed unit in the receiving-end integrated optoelectronic device is configured to demultiplex the received optical signals and to transmit demultiplexed optical signals to different optical receiving units in the receiving-end integrated optoelectronic device corresponding to different active light source links and the selected standby light source link respectively.

Any one optical receiving unit in the receiving-end integrated optoelectronic device is configured to convert the received optical signals into electronic signals and to transmit the electronic signals to the switch processing unit in the receiving-end integrated optoelectronic device.

The switch processing unit in the receiving-end integrated optoelectronic device is configured to switch electronic signals transmitted from an optical receiving unit corresponding to the selected standby light source link to electronic signals transmitted from an optical receiving unit corresponding to the failed active light source link, when detecting that the failed active light source link in the transmitting-end integrated optoelectronic device has been switched to the selected standby light source link.

As can be seen from the above description that, in various embodiments of the present invention, a failure of any one active light source link can be detected, and the standby light source link having a fixed wavelength and its corresponding standby data channel can then be used to provide the service transmission process originally provided by the failed active light source link and its corresponding data channel. Therefore, it is guaranteed that integrated optoelectronic device will continue to function normally when an active light source link fails, thereby providing effective protection for the integrated optoelectronic device and substantially enhancing the reliability of integrated optoelectronic devices.

In addition, in various embodiments of the present invention, the standby light source link having a fixed wavelength and its corresponding standby data channel can automatically become active to provide service transmission process originally provided by the failed active light source link and its corresponding data channel, without replacing the entire optoelectronic integrated circuit as in the existing systems. Therefore, maintenance costs of the integrated optoelectronic devices are significantly reduced.

DETAILED DESCRIPTION

An embodiment of the present invention provides a method for protecting integrated optoelectronic devices. In this method, a standby light source link having a fixed wavelength and a standby data channel corresponding to the standby light source link are provided in the transmitting-end integrated optoelectronic device. It is then detected whether there is a failure in an active light source link in the transmitting-end integrated optoelectronic device, and when an active light source link is determined to have failed, the standby light source link having the fixed wavelength and its corresponding standby data channel are selected to provide a service transmission originally provided by the failed active light source link and its corresponding active data channel.

Figure 1:
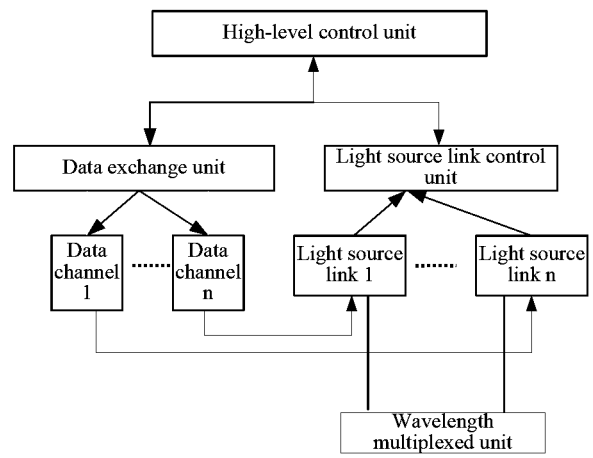
FIG. 1 is a diagram showing internal structure of a transmitting-end integrated optoelectronic device.
Figure 2:
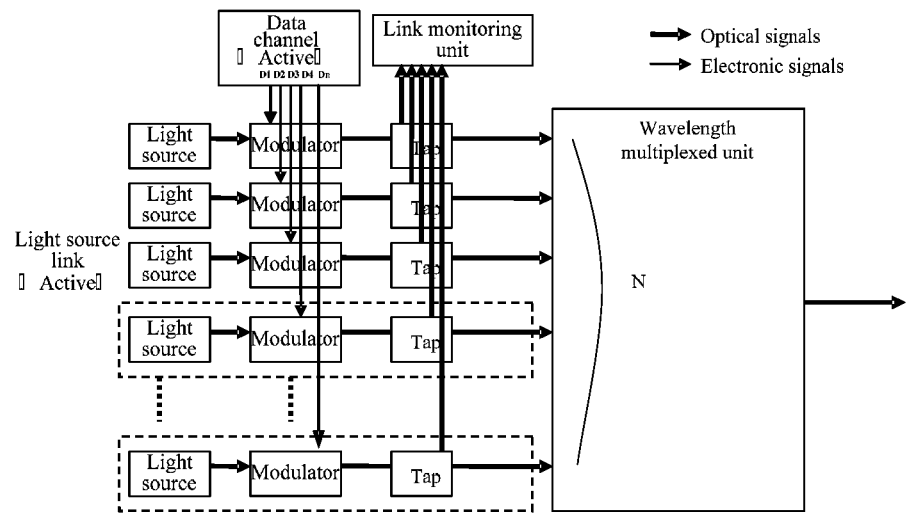
FIG. 2 is a diagram showing a transmitting end in the prior art, in which data transmission is performed by data channels and light source links.
Figure 3:
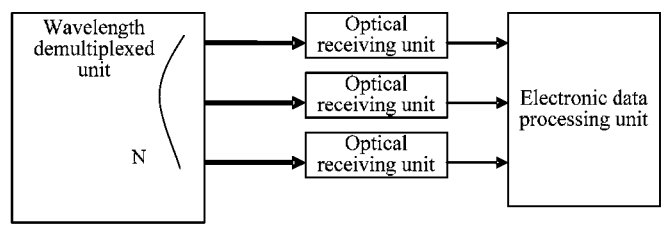
FIG. 3 is a diagram showing structure of a receiving-end integrated optoelectronic device.
Figure 4A:
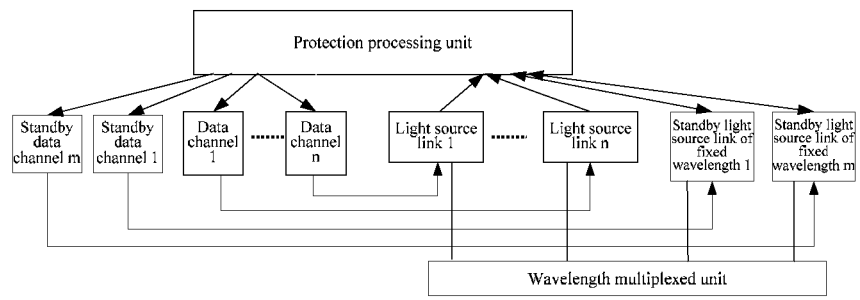
FIG. 4A is a diagram showing basic structure of a transmitting-end integrated optoelectronic device according to an embodiment of the present invention.

According to another embodiment, an integrated optoelectronic device is provided herein. FIG. 4A is a diagram showing the basic structure of a transmitting-end integrated optoelectronic device according to this embodiment. Referring to FIG. 4A, the internal structure of the transmitting-end integrated optoelectronic device mainly includes a protection processing unit, a plurality of active light source links and their corresponding active data channels, one or more standby light source links having fixed wavelengths and their corresponding standby data channels and a wavelength multiplexed unit.

The protection processing unit detects whether there is a failure in an active light source link. When an active light source link is determined to have failed, a standby light source link having a fixed wavelength and its corresponding standby data channel are selected, an enabling indication is transmitted to the selected standby light source link, thereby switching electronic signals transmitted on the active data channel corresponding to the failed active light source link onto the standby data channel corresponding to the selected standby light source link.

The selected standby light source link having the fixed wavelength, after receiving the enabling instruction, modulates optical signals generated by the light sources of the standby link with electronic signals output by its corresponding standby data channel and transmits the modulated optical signals to the wavelength multiplexed unit.

The standby data channel corresponding to the selected standby light source link transmits the received electronic signals to the selected standby light source link.

Figure 4B:
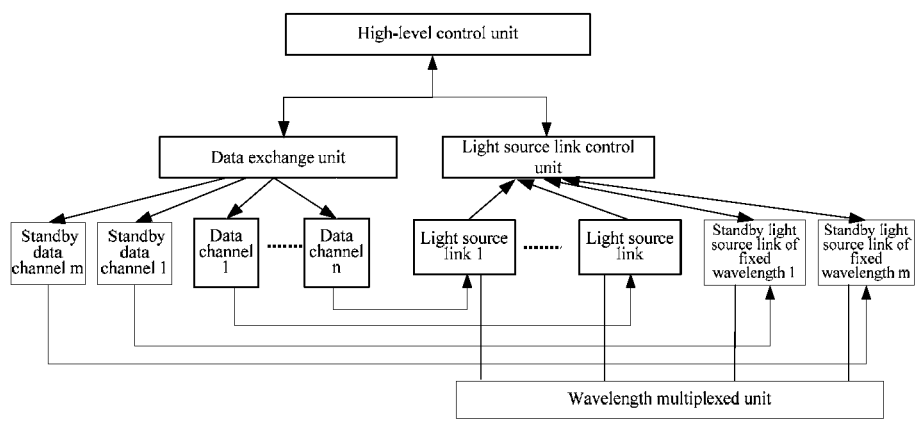
FIG. 4B is a diagram showing specific structure of a transmitting-end integrated optoelectronic device according to an embodiment of the present invention.

FIG. 4B is a diagram showing specific structure of a transmitting-end integrated optoelectronic device in an embodiment of the present invention. Referring to FIGS. 4A and 4B, in the transmitting-end integrated optoelectronic device according to an embodiment of the present invention, the protection processing unit specifically includes a high-level control unit, a data exchange unit, a link monitoring unit and a light source link control unit.

Figure 5A:
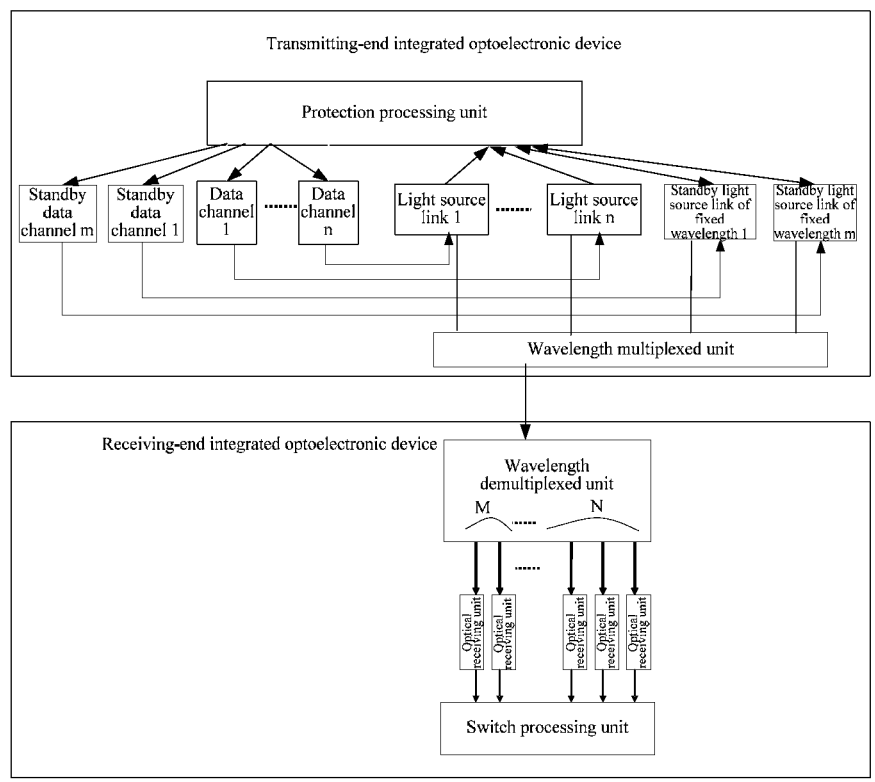
FIG. 5A is a diagram showing the basic structure of the system for protecting integrated optoelectronic devices according to an embodiment of the present invention.

Accordingly, the present invention provides a system for protecting integrated optoelectronic devices. FIG. 5A is a diagram showing the basic structure of the system for protecting integrated optoelectronic devices in an embodiment of the present invention. Referring to FIG. 5A, the system includes a transmitting-end integrated optoelectronic device and a receiving-end integrated optoelectronic device. The transmitting-end integrated optoelectronic device mainly includes a standby light source link associated with a fixed wavelength and its corresponding standby data channel. The receiving-end integrated optoelectronic device includes a wavelength demultiplexed unit, different optical receiving units respectively corresponding to different active light source links and standby light source link in the transmitting-end integrated optoelectronic device, and an switch processing unit.

The transmitting-end integrated optoelectronic device detects whether there is a failure in each active light source link, and when detecting that an active light source link fails, uses the selected standby light source link associated with the fixed wavelength and its corresponding standby data channel to provide a service transmission originally provided by the failed active light source link and its corresponding active data channel, and transmits a wavelength-multiplexed optical signal to the wavelength demultiplexed unit of the receiving-end integrated optoelectronic device.

The wavelength demultiplexed unit demultiplexes the received optical signals and transmit the demultiplexed optical signals to optical receiving units corresponding to different active light source links and the selected standby light source link.

Any one of the optical receiving units converts the received optical signals into electronic signals and then transmits the electronic signals to the switch processing unit.

The switch processing unit, after detecting that the failed active light source link has been switched to the selected standby light source link, switches the electronic signals transmitted from the optical receiving unit corresponding to the selected standby light source link to the electronic signals transmitted from the optical receiving unit corresponding to the failed active light source link.

Figure 5B:
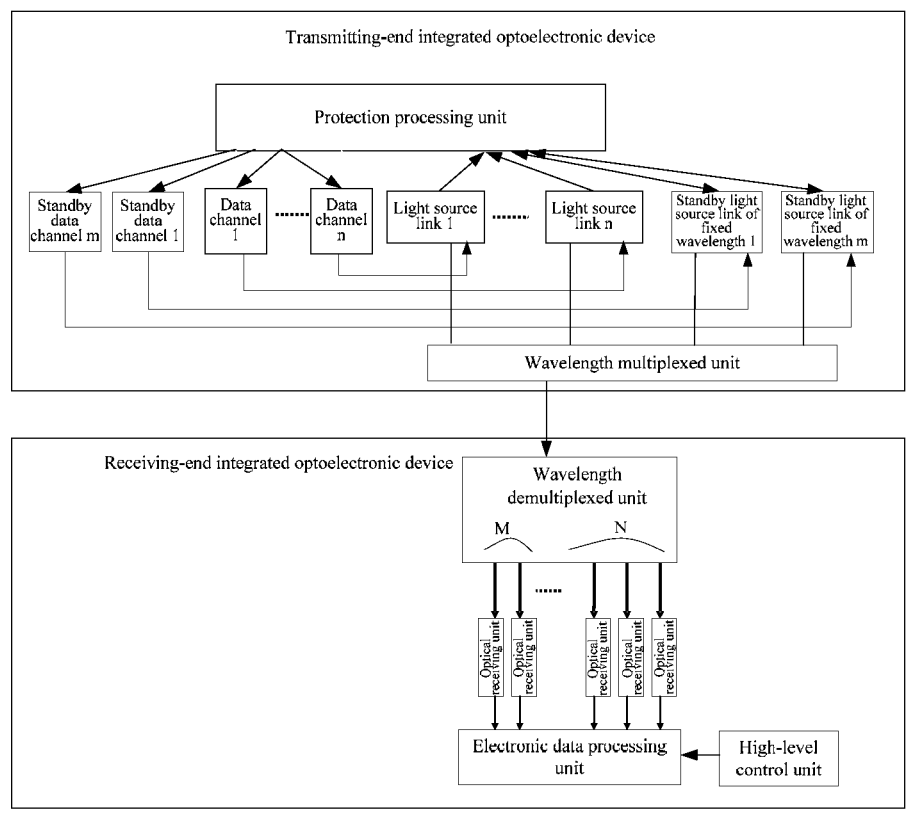
FIG. 5B is a diagram showing the specific structure of the system for protecting integrated optoelectronic devices according to an embodiment of the present invention.

FIG. 5B is a diagram showing the specific structure of the system for protecting integrated optoelectronic devices in an embodiment of the present invention. Referring to FIGS. 5A and 5B, in the system according to the embodiments of the present invention, the specific structure of the transmitting-end integrated optoelectronic device may the same as those of FIGS. 4A and 4B, and the switch processing unit may include the high-level control unit and the electronic data processing unit of the receiving-end integrated optoelectronic device.

In embodiments of the present invention, each of the active light source links and standby light source links mainly includes a light source, and may further include a modulator, and may further include a detection performing unit and/or a light absorber. The detection performing unit, for example, may be a Tap unit.

To make the object, technical solution and advantages of the present invention clearer, further detailed description of the embodiments of the present invention will be given below with reference to drawings and specific embodiments.

Figure 6:
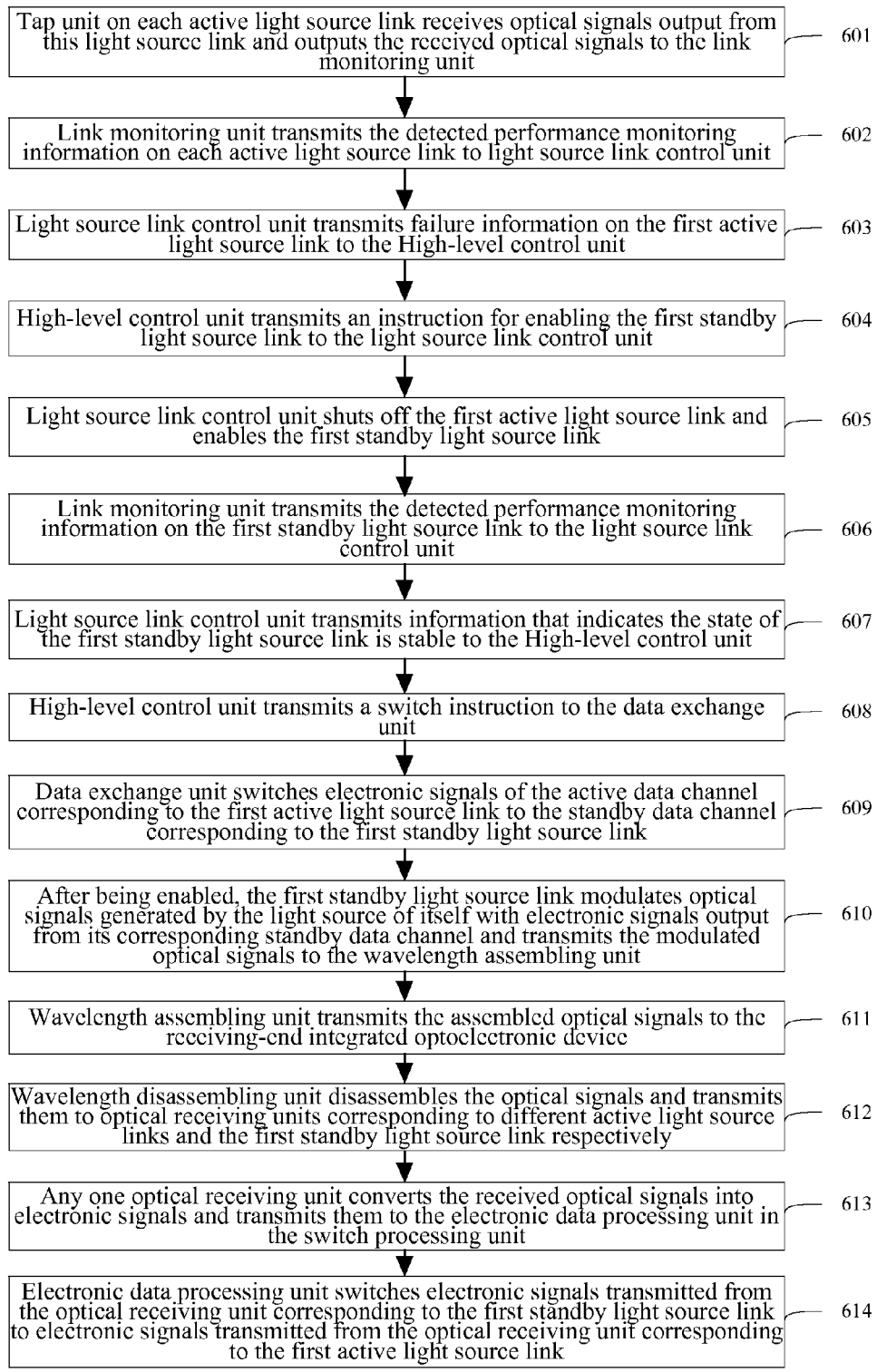
FIG. 6 is a flowchart of protecting integrated optoelectronic devices with the system and integrated optoelectronic devices proposed in embodiments of the present invention.
Figure 7A:
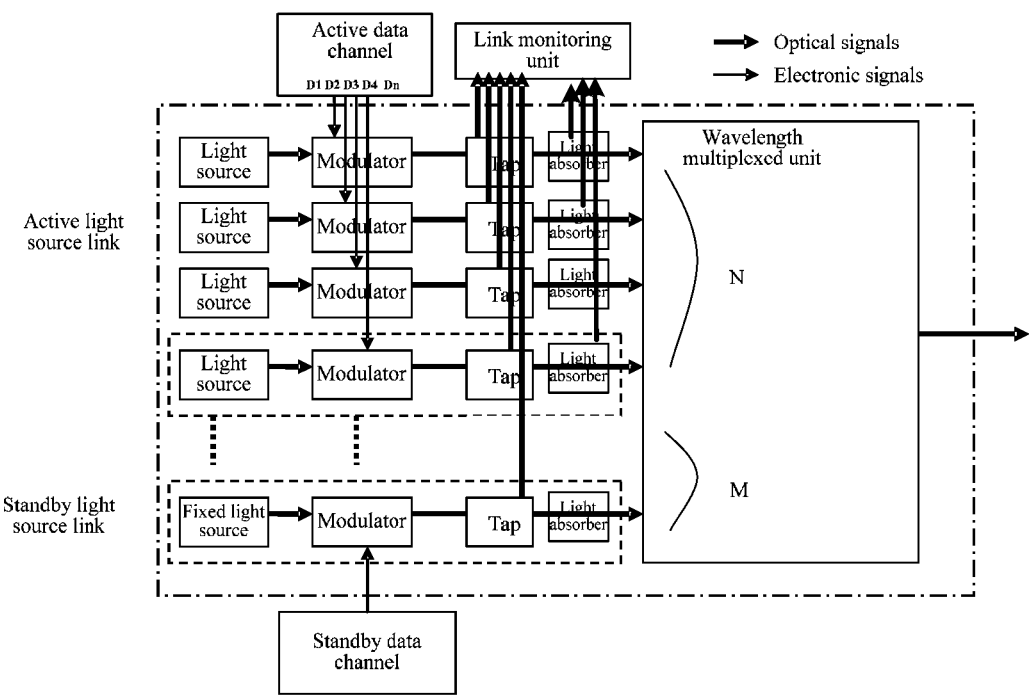
FIG. 7A is a diagram showing a first structure for a transmitting end to realize data transmission with data channels and light source links according to an embodiment of the present invention.
Figure 7B:
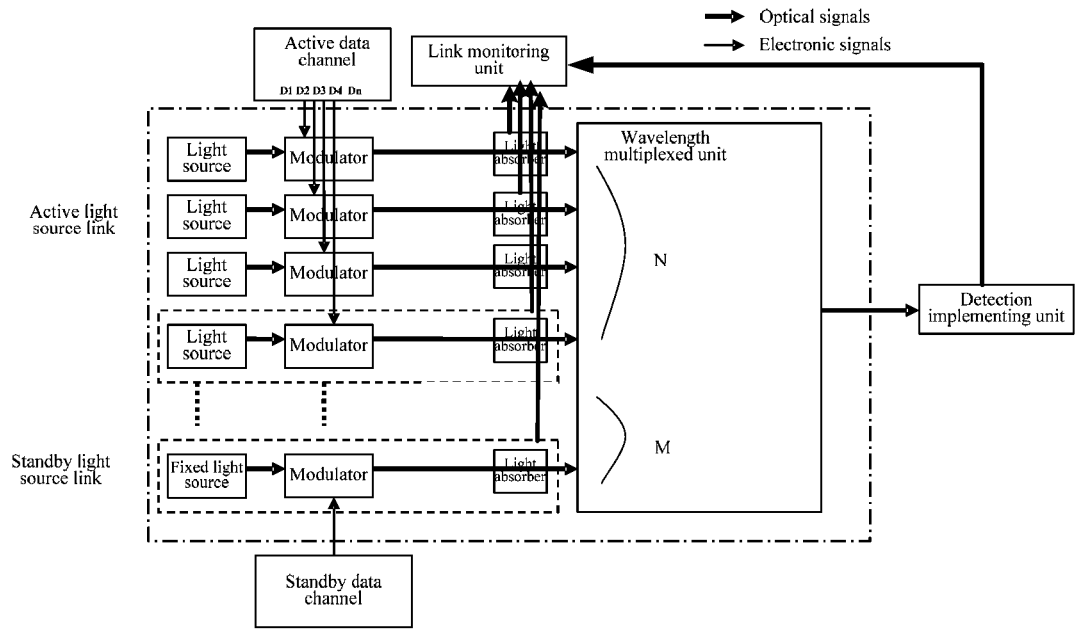
FIG. 7B is a diagram showing a second structure for a transmitting end to realize data transmission with data channels and light source links according to an embodiment of the present invention.

FIG. 6 is a flowchart of protecting integrated optoelectronic devices with the system and integrated optoelectronic devices proposed in embodiments of the present invention. FIG. 7B is a diagram showing a transmitting end to realize data transmission with data channels and light source links according to an embodiment of the present invention. Referring to FIGS. 4A, 4B, 5, 6, 7A and 8, in embodiments of the present invention, one or more standby light source links of fixed wavelength and their corresponding standby data channels are provided in the integrated optoelectronic device in advance. And as shown in FIG. 7A, a detection performing unit is provided on each active light source link. Then, the process of protecting integrated optoelectronic devices with the system and integrated optoelectronic device provided in embodiments of the present invention specifically includes the following steps.

In step 601, in the transmitting-end integrated optoelectronic device, the detection performing unit such as Tap unit on each active light source link receives the optical signals output from this light source link and outputs the received optical signals to the link monitoring unit.

Here, the Tap unit may output a fraction of, such as 5% of the power of the received optical signal to the link monitoring unit.

In step 602, in the transmitting-end integrated optoelectronic device, the link monitoring unit performs performance analysis on optical signals output from the Tap unit on each light source link so as to detect performance of each active light source link, and transmits the detected performance monitoring information of each active light source link to the light source link control unit.

In step 603, in the transmitting-end integrated optoelectronic device, the light source link control unit determines whether each active light source link fails according to the received performance monitoring information on each active light source link and after determining that an active light source link such as the first active light source link fails, transmits failure information on the first active light source link to the high-level control unit.

It should be noted that, in the process of the above steps 601 through 603, failure of the first active light source link is monitored with the structure of the transmitting-end integrated optoelectronic device shown in FIG. 7A. With the structure of the transmitting-end integrated optoelectronic device shown in FIG. 7B in which the detection performing unit is arranged behind the wavelength multiplexed unit, the monitoring process of steps 601 through 603 may be replaced with the process described below.

The detection performing unit such as the Tap unit receives a wavelength multiplexed optical signals output from the wavelength multiplexed unit and outputs the received optical signals to the link monitoring unit. Preferably, the detection performing unit may output a fraction of, such as 5% of the power of the received optical signal to the link monitoring unit; the link monitoring unit performs frequency spectrum and optical power analysis or optical marking signal analysis on the optical signals output from the detection performing unit on each light source link and transmits results of frequency spectrum and optical power analysis or results of optical marking signal analysis of each active light source link to the light source link control unit; the light source link control unit detects performance variation of frequency spectrum and optical power of each active light source link or detects performance variation of optical marking signal of each active light source link according to the received results of frequency spectrum and optical power analysis or results of optical marking signal analysis of each active light source link, so as to determine whether each active light source link fails; and after determining that the first active light source link fails, transmits failure information on the first active light source link to the high-level control unit. In the above process, when optical marking signal is used, optical marking signals should be added to a light source in each light source link in advance, for example, low-frequency disturbance of different frequencies are added to a light source in each light source link.

In step 604, in the transmitting-end integrated optoelectronic device, the high-level control unit transmits an instruction for enabling the first standby light source link to the light source link control unit after receiving failure information on the first active light source link.

Here, if a plurality of standby light source links of fixed wavelength and their corresponding standby data channels are provided in advance in the integrated optoelectronic device, the first standby light source link and its corresponding standby data channel described herein and hereafter are selected by the high-level control unit according to preset priorities for various standby light source links and corresponding standby data channels, or selected arbitrarily by the high-level control unit from the provided various standby light source links and corresponding standby data channels, or selected by the high-level control unit from the provided standby light source links and corresponding standby data channels according to other preset rules.

In step 605, in the transmitting-end integrated optoelectronic device, the light source link control unit disables the first active light source link and enables the first standby light source link after receiving the instruction for enabling the first standby light source link.

Here, the light source link control unit may further enable the light absorber in the first active light source link that absorbs optical signals output from the first active light source link after being enabled, so as to ensure that no disturbing optical signals will be produced after the first active light source link fails.

In step 606, in the transmitting-end integrated optoelectronic device, when the first standby light source link is enabled, the link monitoring unit detects performance of the first standby light source link and transmits the detected performance monitoring information on the first standby light source link to the light source link control unit.

In step 607, in the transmitting-end integrated optoelectronic device, the light source link control unit determines whether the first standby light source link reach a stable state according to the received performance monitoring information on the first standby light source link and transmits information indicating that the state of the first standby light source link is stable, to the high-level control unit after determining that the state of the first standby light source link is stable.

In step 607, before determining the state of the first standby light source link becomes stable, the light source link control unit may transmit a state-not-stable indication to the link monitoring unit. The link monitoring unit controls the light absorber in the first standby light source link having a tunable wavelength to absorb optical signals output from the first standby light source link, so as to prevent the first standby light source link from disturbing other normal links while the first standby light source link is just enabled but not stable. When the state of the first standby light source link becomes stable, the light absorber is then enabled.

In step 608, in the transmitting-end integrated optoelectronic device, the high-level control unit transmits a switch instruction for switching electronic signals of the active data channel corresponding to the first active light source link to the standby data channel corresponding to the first standby light source link to the data exchange unit after receiving the information that indicates the state of the first standby light source link is stable.

It should be noted that, in the above process, the high-level control unit transmits the switch instruction to the data exchange unit only after receiving the information that indicates the state of the first standby light source link is stable. In practical service implementation, the high-level control unit may transmit the switch instruction for switching electronic signals of the active data channel corresponding to the first active light source link to the standby data channel corresponding to the first standby light source link to the data exchange unit immediately after receiving failure information on the first active light source link in the above-mentioned step 604.

In step 609, in the transmitting-end integrated optoelectronic device, after receiving the switch instruction, the data exchange unit switches electronic signals of the active data channel corresponding to the first active light source link to the standby data channel corresponding to the first standby light source link.

In step 610, in the transmitting-end integrated optoelectronic device, after being enabled, the first standby light source link having a fixed wavelength modulates optical signals generated by its own light source with electronic signals output from the standby data channel corresponding thereto and transmits the modulated optical signals to the wavelength multiplexed unit.

Figure 8:
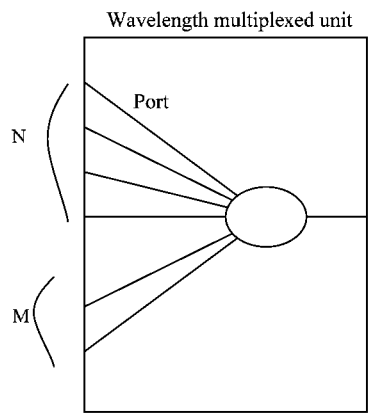
FIG. 8 is a diagram showing the optical multiplexed unit of a transmitting-end integrated optoelectronic device according to an embodiment of the present invention.

Here, referring to FIG. 8, in embodiments of the present invention, the wavelength multiplexed unit preferably may include ports corresponding to various active light source links, which are connected with corresponding active light source links respectively. The wavelength multiplexed unit may also include ports corresponding to each standby light source link having a fixed wavelength, which are connected with corresponding standby light source links respectively. Thus, in this step, the first standby light source link having a fixed wavelength transmits modulated optical signals to a port of the wavelength multiplexed unit corresponding to this first standby light source link.

In step 611, in the transmitting-end integrated optoelectronic device, the wavelength multiplexed unit multiplexes optical signals received on the port corresponding to the active light source link with optical signals received on the port corresponding to the first standby light source link, and transmits the multiplexed optical signals to the receiving-end integrated optoelectronic device.

In step 612, in the receiving-end integrated optoelectronic device, the wavelength demultiplexed unit receives optical signals transmitted from the transmitting-end integrated optoelectronic device, demultiplexes the optical signals and transmits the resultant signals to optical receiving units corresponding to different active light source links and the first standby light source link respectively.

Here, in the receiving-end integrated optoelectronic device, the wavelength demultiplexed unit may include a port corresponding to each active light source link in the transmitting-end integrated optoelectronic device and a port corresponding to each standby light source link having a fixed wavelength in the transmitting-end integrated optoelectronic device. The wavelength demultiplexed unit transmits the demultiplexed optical signals from each light source link in the transmitting-end integrated optoelectronic device to a port corresponding to the light source link itself and each port on the wavelength demultiplexed unit transmits the received optical signal corresponding to a light source link in the transmitting-end integrated optoelectronic device to the optical receiving unit corresponding to the light source link.

In step 613, in the receiving-end integrated optoelectronic device, any one of the optical receiving units converts the received optical signals into electronic signals and transmits the same to the electronic data processing unit in the switch processing unit.

It should be noted that, after the above step 603, after the high-level control unit in the transmitting-end integrated optoelectronic device receives failure information on the first active light source link, the high-level control unit in the transmitting-end integrated optoelectronic device transmits the switch instruction for switching the first active light source link to the first standby light source link to the switch processing unit in the downstream receiving-end integrated optoelectronic device, and it may specifically be as follows: the switch instruction is transmitted to the high-level control unit in the downstream receiving-end integrated optoelectronic device, and the high-level control unit in the receiving-end integrated optoelectronic device transmits a switch instruction for switching electronic signals corresponding to the optical receiving units of the first standby light source link to electronic signals corresponding to optical receiving units of the first active light source link to the electronic data processing unit.

Alternatively, in the above implementation process, the high-level control unit in the transmitting-end integrated optoelectronic device may also not transmit the switch instruction to the high-level control unit in the receiving-end integrated optoelectronic device. Thus, the high-level control unit in the receiving-end integrated optoelectronic device may also monitor the switch instruction in other manners. For example, the high-level control unit in the receiving-end integrated optoelectronic device monitors each optical receiving unit and determines that the first active light source link has been switched to the first standby light source link after monitoring that the optical receiving unit of the first active light source link fails to receive optical signals, that is, optical signals corresponding to failed active light source link in the transmitting-end integrated optoelectronic device are lost, and monitoring the optical receiving unit corresponding to the first standby light source link receives optical signals, thereby transmitting the switch instruction for switching electronic signals of the optical receiving unit corresponding to the first standby light source link and of the optical receiving unit corresponding to the first active light source link to the electronic data processing unit.

In step 614, in the receiving-end integrated optoelectronic device, the electronic data processing unit switches electronic signals transmitted from the optical receiving unit corresponding to the first standby light source link to electronic signals transmitted from the optical receiving unit corresponding to the first active light source link.

So far, the process of protecting integrated optoelectronic devices is completed.

It should be noted that, in the above implementation process, the protection processing unit inside the transmitting-end integrated optoelectronic device according to embodiments of the present invention is implemented with existing high-level control unit, data exchange unit, link monitoring unit and light source link control unit. In addition, the switch processing unit inside the receiving-end integrated optoelectronic device is also implemented with existing high-level control unit and electronic data processing unit. In practical service implementation, the protection processing unit and the switch processing unit may also be newly added functional units inside the integrated optoelectronic device according to the present invention, and the specific implementation process of protecting the integrated optoelectronic devices is identical with the principle of process described in above embodiments.

Furthermore, in above embodiments, both the detection performing unit such as Tap unit and link monitoring unit monitor performance of active light source links. In practical service implementation, the process for monitoring performance of active light source links may also be implemented in other manners and the specific implementation process is identical with the principle of corresponding process described in above embodiments.

In embodiments of the present invention, the active data channel and the standby data channel may be provided in two separate devices or combined in one device.

In addition, in embodiments of the present invention, the light absorber has two functions. One is to monitor optical power of the entire link according to amount of optical power absorbed by the light absorber when the light source link on which the light absorber locates works normally. The other is to make optical signals of the light source link be nearly completely absorbed for the purpose of shutting off the light source of the entire failed link by adding a control signal, typically a voltage signal on the light absorber when the light source link on which the light absorber locates fails. The light absorber may be an optical switch or PIN or other devices. In case of PIN, it can detect optical power output while being applied with positive voltage and can absorb optical signal while being applied with negative voltage.

In addition, in embodiments of the present invention, the wavelength multiplexed unit may be an AWG or N×1 wavelength multiplexer.

In addition, in embodiments of the present invention, various active light source links and standby light source links may locate in the same integrated circuit board or in different integrated circuit boards.

In addition, the above-mentioned embodiments are specifically described with respect to the integrated optoelectronic device and the system for protecting the integrated optoelectronic devices according to embodiments of the present invention. In practical service implementation, the method according to embodiments of the present invention may be entirety independent of the integrated optoelectronic device and the system for protecting the integrated optoelectronic devices according to embodiments of the present invention. Then, the basic implementation process of embodiments of the present invention is identical with the principle of the process described in above embodiments except that functional units need not be distinguished inside the transmitting-end integrated optoelectronic device and the receiving-end integrated optoelectronic device and respective functions in above embodiments are carried out collectively by the transmitting-end integrated optoelectronic device and the receiving-end integrated optoelectronic device.

To sum up, the detailed description is described with respect to preferred embodiments of the present invention and is not for limiting the scope of the invention. Any modifications, equivalent replacements and improvements within the spirit and principle of the present invention should be contained in the scope of the present invention.

What is claimed is:

1. A method for protecting integrated optoelectronic devices, comprising:
    receiving optical signals output from each active light source link in a transmitting-end integrated optoelectronic device and outputting the received optical signals to a link monitoring unit in each active light source link;
    performing, by the link monitoring unit, performance analysis on optical signals output from each light source link so as to detect performance of each active light source link and transmitting the detected performance monitoring information of each active light source link to a light source link control unit in the transmitting-end integrated optoelectronic device;
    determining, by the light source link control unit, whether each active light source link fails according to the received performance monitoring information on each active light source link and after determining that an active light source link fails, transmitting failure information on the active light source link to a high-level control unit in the transmitting-end integrated optoelectronic device;
    transmitting, by the high-level control unit, an instruction for enabling a standby light source link of fixed wavelength to the light source link control unit after receiving failure information on the active light source link;
    disabling, by the light source link control unit, the failed active light source link and enabling the standby light source link after receiving the instruction for enabling the standby light source link;
    when the standby light source link is enabled, detecting by a link monitoring unit in the standby light source link, performance of the standby light source link and transmitting the detected performance monitoring information on the standby light source link to the light source link control unit;
    determining, by the light source link control unit, whether the standby light source link reach a stable state according to the received performance monitoring information on the standby light source link, and transmitting information indicating that the state of the standby light source link is stable, to the high-level control unit after determining that the state of the first standby light source link is stable;
    transmitting, by the high-level control unit, a switch instruction for switching electronic signals of the active data channel corresponding to the failed active light source link to the standby data channel corresponding to the standby light source link to a data exchange unit in the transmitting-end integrated optoelectronic device after receiving the information that indicates the state of the standby light source link is stable;
    after receiving the switch instruction switching by the data exchange unit, electronic signals of the active data channel corresponding to the failed active light source link to the standby data channel corresponding to the standby light source link;
    after the standby light source link is enabled, modulating, by the standby light source link, optical signals generated by its own light source with electronic signals output from the standby data channel corresponding thereto and transmitting the modulated optical signals to a wavelength multiplexed unit in the transmitting-end integrated optoelectronic device; and
    multiplexing, by the wavelength multiplexed unit, optical signals received on the port corresponding to the active light source link with optical signals received on the port corresponding to the standby light source link, and transmitting the multiplexed optical signals to a receiving-end integrated optoelectronic device.

2. The method according to claim 1, wherein the step of multiplexing comprises:
    transmitting the modulated optical signals to a preset port in the wavelength multiplexed unit corresponding to the selected standby light source link; and
    multiplexing, by the wavelength multiplexing unit, the modulated optical signals received at the preset port with optical signals received at another port corresponding to the active light source link.

3. The method according to claim 2, further comprising:
    demultiplexing, by a receiving-end integrated optoelectronic device, the received optical signals and converting multiplexed optical signals into electronic signals corresponding to each light source link; and
    switching, by the receiving-end integrated optoelectronic device, electronic signals corresponding to the selected standby light source link to electronic signals corresponding to the failed active light source link according to the switch instruction.

4. The method according to claim 1, wherein there are a plurality of standby light source links of fixed wavelength and standby data channels corresponding to the standby light source links provided in advance;
    and wherein, the selected standby light source links and the corresponding standby data channels are selected according to priorities preset for the standby light source links and corresponding standby data channels; or,
    the selected standby light source links and corresponding standby data channels are arbitrarily selected from the provided standby light source links and corresponding standby data channels.

5. The method according to claim 1, wherein there are a plurality of standby light source links of fixed wavelength and standby data channels corresponding to the standby light source links provided in advance;
    and wherein, the selected standby light source links of fixed wavelength and the corresponding standby data channels are selected according to priorities preset for the standby light source links and the corresponding standby data channels; or,
    the selected standby light source links and corresponding standby data channels are arbitrarily selected from the provided standby light source links and corresponding standby data channels.

6. An integrated optoelectronic device, comprising at least one active light source link and at least one corresponding active data channel, and a wavelength multiplexed unit, wherein the integrated optoelectronic device further comprises a protection processing unit, at least one standby light source link of fixed wavelength, and standby data channels, wherein:
   when detecting that an active light source link fails, the protection processing unit is configured to detect whether there is failure in each active light source link, to select a standby light source link of fixed wavelength and its corresponding standby data channel provided in advance, to transmit an enabling instruction to the selected standby light source link of fixed wavelength, and to control a process of switching an electronic signal of an active data channel corresponding to a failed active light source link to the standby data channel corresponding to the selected standby light source link;
   the selected standby light source link of fixed wavelength is configured to modulate optical signals generated by light sources of itself with electronic signals output from its corresponding standby data channel and to transmit the modulated optical signals to the wavelength multiplexed unit, after receiving the enabling instruction; and
   the standby data channel corresponding to the selected standby light source link is configured to transmit the received electronic signals to the selected standby light source link,
   wherein the detecting whether there is a failure in each active light source link in a transmitting-end integrated optoelectronic device comprises providing an optical marking signal for a light source of each active light source link in advance, performing optical marking signal analysis on a wavelength multiplexed optical signal and determining whether each active light source link fails by detecting performance variation in the optical marking signal of each active light source link;
   wherein the protection processing unit comprises:
       a link monitoring unit in each active light source link being configured to detect performance of each active light source link, and transmit the detected performance monitoring information of each active light source link to a light source link control unit;
       the light source link control unit being configured to determine whether each active light source link fails according to the received performance monitoring information on each active light source link and after determining that an active light source link fails, transmit failure information on the active light source link to a high-level control unit;
       the high-level control unit being configured to transmit an instruction for enabling a standby light source link to the light source link control unit after receiving failure information on the active light source link, the light source link control unit further foe disabling the failed active light source link and enabling the standby light source link after receiving the instruction for enabling the standby light source link;
       a link monitoring unit in the standby light source link being configured to detect, when the standby light source link is enabled, performance of the standby light source link and transmit the detected performance monitoring information on the standby light source link to the light source link control unit; wherein the light source link control unit being further configured to determine whether the standby light source link reach a stable state according to the received performance monitoring information on the standby light source link and transmit information indicating that the state of the standby light source link is stable, to the high-level control unit after determining that the state of the first standby light source link is stable; the high-level control unit being further configured to transmit a switch instruction for switching electronic signals of the active data channel corresponding to the failed active light source link to the standby data channel corresponding to the standby light source link to a data exchange unit after receiving the information that indicates the state of the standby light source link is stable; and
       the data exchange unit being configured to switch after receiving the switch instruction electronic signals of the active data channel corresponding to the failed active light source link to the standby data channel corresponding to the standby light source link.

7. The integrated optoelectronic device according to claim 6, wherein the wavelength multiplexed unit comprises a port corresponding to each of the at least one active light source link and each of the at least one standby light source link; and
   wherein, the selected standby light source link is configured to transmit the modulated optical signals to the port corresponding to the selected standby light source link.

8. The integrated optoelectronic device according to claim 6, wherein each light source link comprises a detection performing unit, configured to receive optical signals output from the light source link to which the detection performing unit belongs, and to output the optical signals to the link monitoring unit.

9. The integrated optoelectronic device according to claim 6, wherein each light source link comprises a light absorber, and the light absorber in the failed active light source link is configured to absorb the optical signals output from the failed active light source link under the control of the light source link control unit; and
   wherein the light source link control unit is further configured to control the light absorber in the failed active light source link to absorb the optical signals after receiving the instruction for enabling the selected standby light source link.

10. The integrated optoelectronic device according to claim 6, wherein the high-level control unit is further configured to transmit the switch instruction for switching the failed active light source link to the selected standby light source link to a downstream receiving-end integrated optoelectronic device.

11. The integrated optoelectronic device according to claim 6, wherein both the active light source link and the standby light source link locate on a same integrated circuit board or different integrated circuit boards.

12. A system for protecting integrated optoelectronic devices, comprising a transmitting-end integrated optoelectronic device according to claim 6 and a receiving-end integrated optoelectronic device, and the receiving-end integrated optoelectronic device comprises a wavelength demultiplexed unit, at least one optical receiving unit, and a switch processing unit, and wherein:
   the transmitting-end integrated optoelectronic device is configured to detect whether there is failure in each active light source link, and to select a standby light source link having a fixed wavelength and its corresponding standby data channel for accomplishing service transmission of the failed active light source link and its corresponding active data channel, and to transmit a wavelength multiplexed optical signal to the wavelength demultiplexed unit in the receiving-end integrated optoelectronic device, when detecting that an active light source link is failed;

the wavelength demultiplexed unit in the receiving-end integrated optoelectronic device is configured to demultiplex the received optical signals and to transmit demultiplexed optical signals to different optical receiving units in the receiving-end integrated optoelectronic device corresponding to different active light source links and the selected standby light source link respectively;

any one optical receiving unit in the receiving-end integrated optoelectronic device is configured to convert the received optical signals into electronic signals and to transmit the electronic signals to the switch processing unit in the receiving-end integrated optoelectronic device; and the switch processing unit in the receiving-end integrated optoelectronic device is configured to switch electronic signals transmitted from an optical receiving unit corresponding to the selected standby light source link to electronic signals transmitted from an optical receiving unit corresponding to the failed active light source link, when detecting that the failed active light source link in the transmitting-end integrated optoelectronic device has been switched to the selected standby light source link, and wherein the detecting whether there is a failure in each active light source link in the transmitting-end integrated optoelectronic device comprises providing an optical marking signal for a light source of each active light source link in advance, performing optical marking signal analysis on a wavelength-assembled optical signal and determining whether each active light source link fails by detecting performance variation in the optical marking signal of each active light source link.

13. The system according to claim 12, wherein the wavelength demultiplexed unit comprises: a first port corresponding to an active light source link in the transmitting-end integrated optoelectronic device and a second port corresponding to a standby light source link associated with a fixed wavelength in the transmitting-end integrated optoelectronic device;

and wherein the wavelength demultiplexed unit is configured to transmit the demultiplexed optical signals to a port corresponding to the light source link itself; and each port on the wavelength demultiplexed unit is configured to transmit the received optical signal corresponding to a light source link in the transmitting-end integrated optoelectronic device to the optical receiving unit corresponding to the light source link.

14. The system according to claim 12, wherein the switch processing unit comprises a high-level control unit and an electronic data processing unit, and wherein:

the high-level control unit is configured to transmit a switch instruction for switching electronic signals of one of the at least one optical receiving unit corresponding to the selected standby light source link to electronic signals of another one of the at least one optical receiving unit corresponding to the failed active light source link to the electronic data processing unit, after detecting that the failed active light source link in the transmitting-end integrated optoelectronic device has been switched to the selected standby light source link; and the electronic data processing unit is configured to switch electronic signals transmitted from the one of the at least one optical receiving unit corresponding to the selected standby light source link to electronic signals transmitted from the another one of the at least one optical receiving unit corresponding to the failed active light source link according to the received switch instruction.

15. The system according to claim 14, wherein:

the transmitting-end integrated optoelectronic device is further configured to transmit the switch instruction for switching the failed active light source link to the selected standby light source link to the high-level control unit in the receiving-end integrated optoelectronic device; and the high-level control unit in the receiving-end integrated optoelectronic device is configured to determine that it has been monitored that the failed active light source link in the transmitting-end integrated optoelectronic device has been switched to the selected standby light source link according to the switch instruction transmitted from the transmitting-end integrated optoelectronic device.

16. The system according to claim 14, wherein the high-level control unit in the receiving-end integrated optoelectronic device is configured to detect each of the at least one optical receiving unit and to determine that it has been monitored that the failed active light source link in the transmitting-end integrated optoelectronic device has been switched to the selected standby light source link after monitoring that the one of the at least one optical receiving unit corresponding to the failed active light source link fails to receive optical signals and monitoring that the another one of the at least one optical receiving unit corresponding to the selected standby light source link receives optical signals.

17. The system according to claim 12, wherein the transmitting-end integrated optoelectronic device comprises a protection processing unit, standby light source links of fixed wavelength and standby data channels, and wherein:

the protection processing unit is configured to detect whether there is a failure in an active light source link, and to select the standby light source link of fixed wavelength and its corresponding standby data channel provided in advance, to transmit an enabling instruction to the selected standby light source link, and to control the process of switching an electronic signal of an active data channel corresponding to the failed active light source link to the standby data channel corresponding to the selected standby light source link, when detecting that the failed active light source link;

the selected standby light source link is configured to modulate optical signals generated by light sources of the selected standby light source link with electronic signals output from its corresponding standby data channel and to transmit the modulated optical signals to the wavelength demultiplexed unit, after receiving the enabling instruction; and the standby data channel corresponding to the selected standby light source link is configured to transmit received electronic signals to the selected standby light source link.

* * * * *

UNITED STATES PATENT AND TRADEMARK OFFICE
CERTIFICATE OF CORRECTION

| | |
|---|---|
| PATENT NO. | : 8,606,099 B2 |
| APPLICATION NO. | : 12/398684 |
| DATED | : December 10, 2013 |
| INVENTOR(S) | : Duan et al. |

Page 1 of 1

It is certified that error appears in the above-identified patent and that said Letters Patent is hereby corrected as shown below:

In the Claims

Column 13, Claim 6, line 55 "further foe disabling" should read --further for disabling--.

Signed and Sealed this
Twenty-fifth Day of March, 2014

Michelle K. Lee
*Deputy Director of the United States Patent and Trademark Office*